United States Patent
Woodall et al.

(10) Patent No.: US 11,691,745 B1
(45) Date of Patent: Jul. 4, 2023

(54) SYSTEMS AND METHODS FOR LOCKING AN ELECTRIC PROPULSION SYSTEM

(71) Applicant: BETA AIR, LLC, South Burlington, VT (US)

(72) Inventors: Christopher Woodall, South Burlington, VT (US); Nathan Ward, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/734,023

(22) Filed: Apr. 30, 2022

(51) Int. Cl.
*B64D 27/24* (2006.01)
*B64D 31/00* (2006.01)
*B64D 35/00* (2006.01)
*B64C 39/02* (2023.01)
*B64C 29/00* (2006.01)

(52) U.S. Cl.
CPC ............ *B64D 27/24* (2013.01); *B64D 31/00* (2013.01); *B64D 35/00* (2013.01); *B64C 29/0008* (2013.01); *B64C 39/024* (2013.01)

(58) Field of Classification Search
CPC ........ B64D 27/24; B64D 31/00; B64D 35/00; B64D 2201/042; H02P 3/04; H02P 3/00; H02K 11/215
See application file for complete search history.

(56) References Cited

U.S. PATENT DOCUMENTS

| | | | |
|---|---|---|---|
| 2,486,672 A | 11/1949 | Notestein et al. | |
| 7,478,995 B2 | 1/2009 | Louis et al. | |
| 8,540,183 B2 | 9/2013 | Morris et al. | |
| 8,840,057 B2 | 9/2014 | Moret | |
| 9,458,844 B2 | 10/2016 | Gieras et al. | |
| 9,677,564 B1 | 6/2017 | Woodworth et al. | |
| 10,183,744 B2 | 1/2019 | Gamble | |
| 10,597,152 B2 | 3/2020 | Groninga et al. | |
| 10,671,094 B2* | 6/2020 | Kimchi | F16P 3/14 |
| 10,974,836 B2 | 4/2021 | Harwood et al. | |
| 11,186,378 B2 | 11/2021 | Dubreuil et al. | |
| 11,391,290 B2* | 7/2022 | Tan-Kim | F04D 29/388 |
| 2013/0134264 A1 | 5/2013 | Carter, Jr. et al. | |
| 2017/0160750 A1* | 6/2017 | Kimchi | H02P 5/68 |

(Continued)

FOREIGN PATENT DOCUMENTS

WO    2021201927    10/2021

OTHER PUBLICATIONS

N/A, Electric actuator, Dec. 16, 2021.

*Primary Examiner* — Philip J Bonzell
(74) *Attorney, Agent, or Firm* — Caldwell Intellectual Property Law

(57) ABSTRACT

A locking system for an electric propulsion system is disclosed. The system includes a propulsor configured to propel an electric vehicle and a motor operatively connected to the propulsor configured to power the propulsor. The motor includes a rotor connected to the propulsor and a stator configured to rotate the rotor. A propulsor sensor is configured to determine a motion parameter of the propulsor. A lock is configured to prevent a movement of the propulsor. A controller is configured to receive a signal from the propulsor sensor and control the motor as a function of the signal from the propulsor sensor, wherein controlling the motor includes allowing the propulsor to slow at a desired rate for parking.

20 Claims, 5 Drawing Sheets

(56) References Cited

U.S. PATENT DOCUMENTS

| | | | |
|---|---|---|---|
| 2017/0175753 A1* | 6/2017 | Tan-Kim | F04D 25/045 |
| 2018/0208301 A1* | 7/2018 | Ye | B64D 35/00 |
| 2019/0384297 A1 | 12/2019 | Hehn et al. | |
| 2020/0149542 A1* | 5/2020 | Tan-Kim | F02K 3/06 |
| 2020/0257314 A1* | 8/2020 | Kimchi | B64D 27/24 |
| 2020/0262574 A1* | 8/2020 | Peleg | B64C 39/024 |
| 2020/0385130 A1* | 12/2020 | Verna | B64D 27/24 |
| 2021/0403151 A1* | 12/2021 | Ye | B64C 11/00 |
| 2022/0029482 A1* | 1/2022 | Shigeta | H02K 1/278 |
| 2022/0029504 A1* | 1/2022 | Makino | H02K 5/225 |
| 2022/0173628 A1* | 6/2022 | Tanaka | H02K 11/215 |

\* cited by examiner

SYSTEMS AND METHODS FOR LOCKING AN ELECTRIC PROPULSION SYSTEM

FIELD OF THE INVENTION

The present invention generally relates to the field of electric vehicles. In particular, the present invention is directed to systems and methods for locking an electric propulsion system.

BACKGROUND

In electric multi-propulsion systems, such as electric vertical take-off and landing (eVTOL) aircraft, movement of a rotor not in use during flight may generate undesirable drag.

SUMMARY OF THE DISCLOSURE

In an aspect of the present disclosure is a locking system for an electric propulsion system, the system including a propulsor configured to propel an electric vehicle; a motor operatively connected to the propulsor, the motor configured to power the propulsor, the motor comprising: a rotor connected to the propulsor; and a stator configured to rotate the rotor; a propulsor sensor configured to determine a motion parameter of the propulsor; a lock configured to prevent a movement of the propulsor; a controller in the electric vehicle, the controller configured to: receive a signal from the propulsor sensor; control the motor as a function of the signal from the propulsor sensor, wherein controlling the motor includes allowing the propulsor to slow at a desired rate for parking.

In another aspect of the present disclosure is a method for locking an electric propulsion system, the method including receiving, at a controller in an electric vehicle, a signal from a propulsor sensor configured to determine a motion parameter of a propulsor; controlling, by the controller, a motor as a function of the signal from the propulsor sensor, the motor operatively connected to the propulsor, wherein controlling the motor comprises allowing the propulsor to slow at a desired rate for parking; and engaging, by the controller, a lock configured to prevent a movement of the propulsor.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for locking an electric propulsion system. In an embodiment, a locking system includes a propulsor configured to propel an electric vehicle, such as an electric aircraft, and a motor configured to power the propulsor. The motor includes a rotor connected to the propulsor and a stator configured to rotate the rotor. A propulsor sensor may be configured to determine a motion parameter of the propulsor and transit a signal based on the motion parameter to a controller. The system may include a lock configured to prevent a movement of the propulsor. The lock may include a solenoid that engages based upon a current applied to it, which may be from the motor. The lock may be configured to disengage when current is received from the motor. The controller may be configured to control the motor as a function of the signal from the propulsor sensor. The controller may allow the propulsor to slow at a desired rate for parking. Exemplary embodiments illustrating aspects of the present disclosure are described below in the context of several specific examples.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Figure 1:
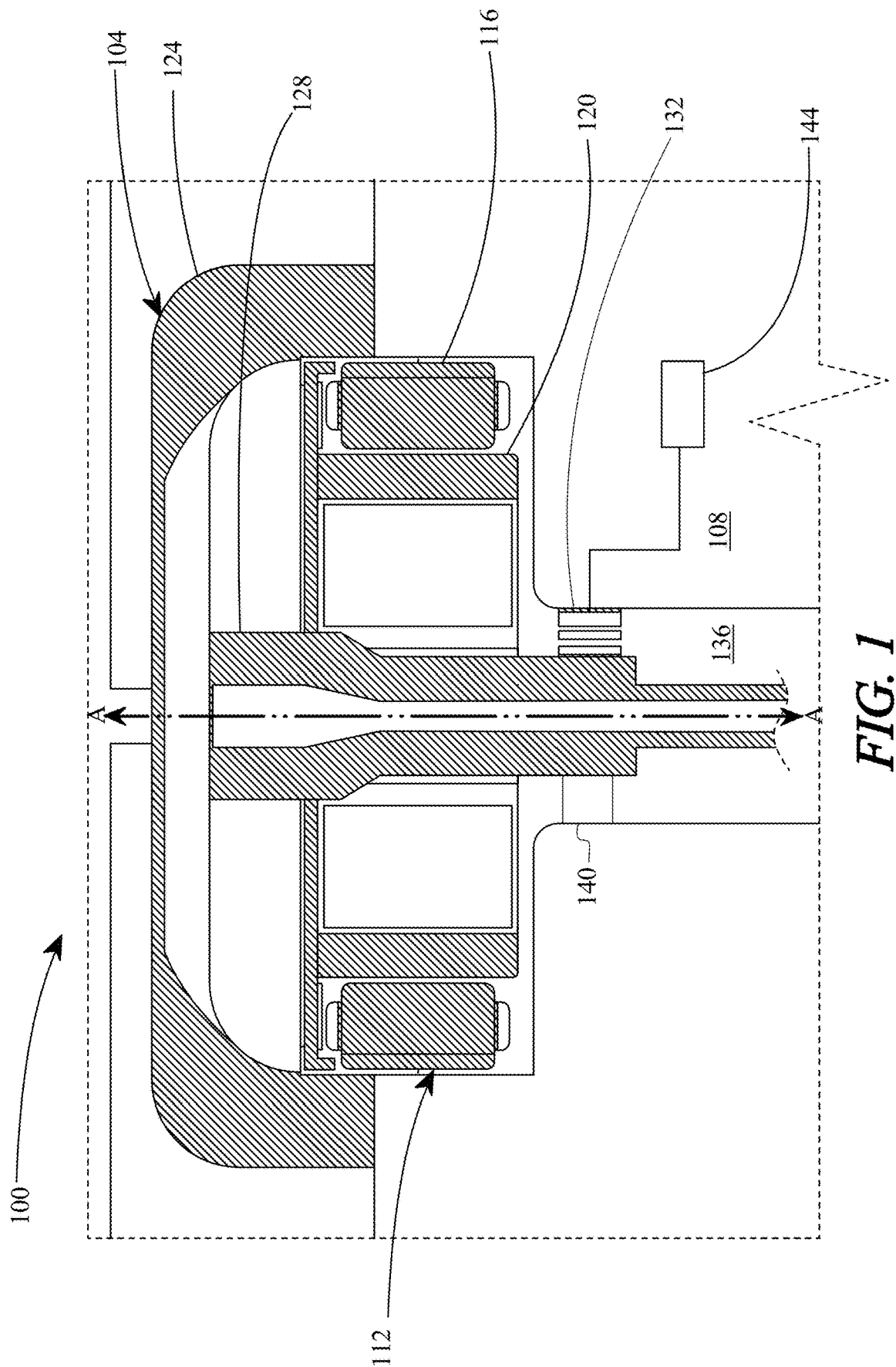
FIG. 1 is a cross-sectional view of an exemplary embodiment of a system for locking an electric propulsion system.

Now referring to FIG. 1, a cross-section view of an exemplary embodiment of a locking system for an electric propulsion system is illustrated. System 100 includes a propulsor 104 configured to propel an electric vehicle 108. Electric vehicle 108 may be electric aircraft each powered by one or more electric motor 112. Electric vehicle may be electric aircraft 300 shown in FIG. 3. Electric vehicle 108 may include electrical vertical takeoff and landing (eVTOL) aircraft, helicopter, unmanned aerial vehicles (UAVs), drones, rotorcraft, commercial aircraft, and/or the like. Electric vehicle 108 may include one or more components that generate lift, including without limitation wings, airfoils, rotors, propellers, jet engines, or the like, or any other component or feature that an aircraft may use for mobility during flight. A propulsor, as used herein, is a component or device used to propel a craft by exerting force on a fluid medium, which may include a gaseous medium such as air or a liquid medium such as water. Propulsor 104 may be any device or component that consumes electrical power on demand to propel an aircraft or other vehicle while on ground and/or in flight. Propulsor 104 may include one or more propulsive devices. Propulsor 104 may include a lift propulsor. In an embodiment, propulsor 104 may include a thrust element which may be integrated into the propulsor 104. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. As another non-limiting example, propulsor 104 may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like. In an embodiment, propulsor 104 may include at least a blade. Persons skilled in the art, upon reviewing the entirety of this disclosure, will be aware of various devices that may be used as propulsor 104. In an embodiment, when a propulsor twists and pulls air behind it, it will, at the same time, push the aircraft forward with an equal amount of force. The more air pulled behind the aircraft, the more the aircraft is pushed forward. In an embodiment, thrust element may include a helicopter rotor incorporated into propulsor 104. A helicopter rotor, as used herein, may include one or more blade or wing elements driven in a rotary motion to drive fluid medium in a direction axial to the rotation of the blade or wing element. Its rotation is due to the interaction between the windings and magnetic fields which produces a torque around the rotor's axis. A helicopter rotor may include a plurality of blade or wing elements.

System 100 includes a motor 112 operatively connected to propulsor 104. Motor 112 is configured to power propulsor 104. As used in this disclosure, "motor" is a device, such as an electric motor, that converts electrical energy into mechanical energy, for instance by causing a shaft to rotate. An electric motor may be driven by direct current (DC) electric power. As an example and without limitation, an electric motor may include a brushed DC electric motor or the like. An electric motor may be, without limitation, driven by electric power having varying or reversing voltage levels, such as alternating current (AC) power as produced by an alternating current generator and/or inverter, or otherwise varying power, such as produced by a switching power source. An electric motor may include, for example and without limitation, brushless DC electric motors, permanent magnet synchronous an electric motor, switched reluctance motors, or induction motors. In addition to inverter and/or a switching power source, a circuit driving an electric motor may include electronic speed controllers (not shown) or other components for regulating motor speed, rotation direction, and/or dynamic braking. Motor 112 may be used in an electric vehicle such as an electric automobile and an electric aircraft, including an electrical vertical takeoff and landing (eVTOL) aircraft, a helicopter, a commercial aircraft, an unmanned aerial vehicle, a rotorcraft, and the like. Motor 112 may include the exemplary embodiment of motor 200 discussed in reference to FIG. 2. Motor 112 may be consistent with disclosure of motor in U.S. patent application Ser. No. 17/563,498 filed on Dec. 28, 2021 and titled "AN ELECTRIC AIRCRAFT LIFT MOTOR WITH AIR COOLING", which is incorporated by reference herein in its entirety.

Motor 112 includes a stator 116. As used in this disclosure, a "stator" is a stationary component of a motor and/or motor assembly. In an embodiment, stator 116 may include at least first magnetic element. As used herein, first magnetic element is an element that generates a magnetic field. For example, first magnetic element may include one or more magnets which may be assembled in rows along a structural casing component. Further, first magnetic element may include one or more magnets having magnetic poles oriented in at least a first direction. The magnets may include at least a permanent magnet. Permanent magnets may be composed of, but are not limited to, ceramic, alnico, samarium cobalt, neodymium iron boron materials, any rare earth magnets, and the like. Further, the magnets may include an electromagnet. As used herein, an electromagnet is an electrical component that generates magnetic field via induction; the electromagnet may include a coil of electrically conducting material, through which an electric current flow to generate the magnetic field, also called a field coil or field winding. A coil may be wound around a magnetic core, which may include without limitation an iron core or other magnetic material. The core may include a plurality of steel rings insulated from one another and then laminated together; the steel rings may include slots in which the conducting wire will wrap around to form a coil. First magnetic element may act to produce or generate a magnetic field to cause other magnetic elements to rotate, as described in further detail below. Stator 116 may include a frame to house components including first magnetic element, as well as one or more other elements or components as described in further detail below. In an embodiment, a magnetic field may be generated by first magnetic element and can include a variable magnetic field. In embodiments, a variable magnetic field may be achieved by use of an inverter, a controller, or the like. In an embodiment, stator 116 may have an inner and outer cylindrical surface; a plurality of magnetic poles may extend outward from the outer cylindrical surface of the stator 116. In an embodiment, stator 116 may include an annular stator, wherein the stator is ring-shaped. In an embodiment, stator 116 may be incorporated into a DC motor where stator is fixed and functions to supply the magnetic fields where a corresponding rotor, as described in further detail below, rotates. In an embodiment, stator 116 may be incorporated in an AC motor where stator 116 is fixed and functions to supply the magnetic fields by radio frequency electric currents through an electromagnet to a corresponding rotor, as described in further detail below, rotates.

Motor 112 includes a rotor 120 coaxial within stator 116. A rotor is a portion of an electric motor that rotates with respect to a stator of the electric motor, such as stator 116. Rotor 120 may include a second magnetic element, which may include one or more magnetic elements. Stator 116 is configured to rotate rotor 120. For example, stator 116 may be configured to generate a magnetic field from first magnetic element in stator 116 to cause second magnetic element in rotor 120, and thus the rotor 120, to rotate around a central axis A. Rotor 120 is connected to propulsor 104. In some embodiments, rotor 120 may be integrated into propulsor 104. Propulsor 104, such as a hub 124 of the propulsor 104, may to attached to a rotor shaft 128 of rotor 120. A rotation of rotor 120 may cause propulsor 104 to also rotate around central axis A, which may translate into propulsion such as lift and/or thrust.

System 100 includes a propulsor sensor 132 configured to determine a motion parameter of propulsor 104. As used in this disclosure, a "propulsor sensor" is a device that is configured to detect an input and/or a phenomenon pertaining to a propulsor 104 and generate a signal related to the detection; propulsor sensor 132 may include one or more sensors. For example, and without limitation, propulsor sensor 132 may transduce a detected motion parameter of propulsor 104. As used in this disclosure, a "motion parameter" is a numerical or other measurable factor pertaining to a propulsor 104. Motion parameter may include a rate of rotation of propulsor 104 and/or a position of propulsor 104, such as a position of one or more blades on the propulsor 104. Propulsor sensor 132 may include a magnetic proximity sensor, inductive proximity sensor, Hall effects sensor, displacement sensor, light sensor, position sensor, and/or the like. Propulsor sensor 132 may be on stator 116, rotor 120, rotor shaft 128, an interior surface of a cavity 136 that motor 112 may be disposed or recessed within, such as a boom, and/or any component of electric vehicle 108 conducive to the propulsor sensor 132 being positioned to measure motion parameter. Propulsor sensor 132 may include a proximity sensor, such as any proximity sensor discussed above, and proximity sensor target. Proximity sensor may be on a component of electric vehicle 108 that remains stationary in relation to propulsor 104, such as stator 116, a boom of the electric vehicle 108, and/or any other component of the electric vehicle 108. Proximity sensor target may be on rotor 120, rotor shaft 128, propulsor 104, and/or any other component of electric vehicle 108 that remains stationary relative to propulsor 104. In some embodiments, proximity sensor target may have a unique and/or asymmetrical shape. For example, proximity sensor target may be shaped as an arc, swoosh, triangle, or any other shape that is asymmetrical along any axis parallel to a length of rotor shaft 128. Proximity sensor target may have a varying thickness along a radially direction perpendicular to a length of rotor shaft 128. For example, as rotor 120 and rotor shaft 128 rotate in relation to a point on cavity 136, the thickness of a part of proximity sensor target that is nearest and/or facing the point on cavity 136 changes. A proximity sensor may be configured to measure a thickness and/or shape of proximity sensor target and, therefore, may deduce a position of propulsor 104 and/or a rate of rotate of propulsor 104. Proximity sensor target may include a plurality of proximity sensor targets. Each of plurality of proximity sensor targets may be positioned on rotor shaft 128, radially displaced from each other, and/or with a distinct shape and/or thickness. Signal generated by propulsor sensor 132 may be based on a proximity between proximity sensor and proximity sensor target. Signal may be based on a cross sectional shape and/or thickness of a part of proximity sensor target nearest proximity sensor, wherein the cross section is parallel with a length of rotor shaft 128 and central axis A.

System 100 may include a lock 140 configured to prevent a movement of propulsor 104. Specifically, lock 140 may be configured to prevent a rotation of propulsor 104. By preventing propulsor 104 from moving, drag may be reduced when electric vehicle 108 is flying but not using a particular propulsor 104, such as for example, when the electric vehicle 108 is switching from rotor-based flight to fixed-wing flight and no longer needs a propulsor attached to a lift motor. Transitioning between hovering and other modes of flight, such as fixed-wing flight, may be achieved by locking lift propulsors in optimal positions. A lift propulsor may be smoothly and monotonically decelerated to an ideal parking speed or position so that lock 140 may engage and completely cease and restrict movement of the lift propulsor during a flight mode transition. Lock 140 may be a magnetic lock controlled by an applied current. Lock 140 may include a solenoid configured to arrest and/or allow movement of propulsor 104 when energized. As used in this disclosure, a "solenoid" is an electromagnet including a coil of wire and a slidable ferromagnetic plunger, also known as an armature, in the coil. The plunger may partially extend from the coil when current is not applied to solenoid. When sufficient current is applied to solenoid, the electromagnetic force generated by the coil may pull the plunger into the coil. Solenoid may be configured such that it engages lock 140 to prevent movement of propulsor 104 when the plunger extends from the coil. Solenoid may be energized by current from motor 112 in parallel or series with the motor 112, such that energizing the motor 112 engages solenoid and disengages lock 140. In some embodiments, solenoid current may be inductively coupled from motor 112. System 100 may include a switch to control current applied to solenoid. In some embodiments, lock 140 may include a bolt and receiver, wherein the receiver is configured to receive the bolt and prevent the bolt from moving in relation to the receiver. The receiver may be positioned on rotor 120, rotor shaft 128, propulsor 104, and/or hub 124. Plunger may be configured to engage the bolt into the receiver when plunger is partially extended. For example, plunger may displace the bolt and press it into the receiver. In some embodiments, the extended end of plunger may act as the bolt and be pressed into the receiver. Lock 140 may be consistent with disclosure of magnetic lock in U.S. patent application Ser. No. 17/732,791 filed on Apr. 29, 2022 and titled "MAGNETIC LOCKING SYSTEM OF AN ELECTRIC AIRCRAFT ROTOR AND METHODS THEREOF", which is incorporated by reference herein in its entirety.

In some embodiments, lock 140 may include a braking module. Braking module may be configured to decrease a rate of rotation of propulsor 104. Braking module may be configured to control a deceleration a rate of rotation of propulsor 104. For example, braking module may be configured to decelerate a rate of rotation of propulsor 104 at a specified deceleration rate. Braking module may be configured to maintain deceleration of a rate of rotation of propulsor 104 within a specified range. Braking module may be configured to prevent propulsor 104 from exceeding a predetermined threshold of deceleration by reducing and/or stopping the braking when the threshold is reached. Braking module may include a first braking pad on rotor 120, rotor shaft 128, propulsor 104, and/or hub 124, and a second braking pad configured to press against first braking pad. Second braking pad may be on cavity 136, stator 116, a boom of electric vehicle 108, and/or other component of electric vehicle 108. Plunger may be configured to press second braking pad against first braking pad as the plunger extends from the coil. In some embodiments, braking module may be configured to lock 140 propulsor 104 and prevent a movement of the propulsor 104. For example, braking module may be configured to gradually increase the pressure between first braking pad and second braking pad to slow a rate of rotation of propulsor 104 at a controlled rate and eventually lock 140 the propulsor 104. Deceleration of propulsors may include any system or method of propeller parking as described in U.S. Nonprovisional application Ser. No. 17/732,774, filed on Apr. 30, 2022, and entitled "A SYSTEM FOR PROPELLER PARKING CONTROL FOR AN ELECTRIC AIRCRAFT AND A METHOD FOR ITS USE," the entirety of which is incorporated herein by reference. Engagement of lock 140 may be based on a rotational speed of propulsor 104.

Still referring to FIG. 1, system 100 includes a controller 144 in electric vehicle 108. Controller 144 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 144 may include a single computing device operating independently, or may include two or more computing device operating in concert, in parallel, sequentially or the like; two or more computing devices may be included together in a single computing device or in two or more computing devices. Controller 144 may interface or communicate with one or more additional devices as described below in further detail via a network interface device. Network interface device may be utilized for connecting controller 144 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 144 may include but is not limited to, for example, a computing device or cluster of computing devices in a first location and a second computing device or cluster of computing devices in a second location. Controller 144 may include one or more computing devices dedicated to data storage, security, distribution of traffic for load balancing, and the like. Controller 144 may distribute one or more computing tasks as described below across a plurality of computing devices of computing device, which may operate in parallel, in series, redundantly, or in any other manner used for distribution of tasks or memory between computing devices. Controller 144 may be implemented using a "shared nothing" architecture in which data is cached at the worker, in an embodiment, this may enable scalability of system 100 and/or computing device.

With continued reference to FIG. 1, controller 144 may be designed and/or configured to perform any method, method step, or sequence of method steps in any embodiment described in this disclosure, in any order and with any degree of repetition. For instance, controller 144 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 144 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Controller 144 may be communicatively connected to propulsor sensor 132. As used in this disclosure, "communicatively connected" means connected by way of a connection, attachment or linkage between two or more relate which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Controller 144 may be configured to receive a signal from propulsor sensor 132 based on a motion parameter of propulsor 104 determined by the propulsor sensor 132.

Controller 144 may be configured to control motor 112 as a function of signal from propulsor sensor 132. Controlling motor 112 may include allowing propulsor 104 to slow at a desired rate for parking. As used in this disclosure, "parking" is a state of an electric vehicle 108 that is grounded, stationary, and its propulsors are not in use. Controller 144 may be configured to control a deceleration of a rate of rotation of propulsor 104 by gradually reducing an amount of power provided to the propulsor 104 by motor 112. For example, if a pilot inputs in controls a command to stop powering propulsor 104, controller 144 may gradually reduce the power provided to the propulsor 104 to control a rate of deceleration of the propulsor 104. Controller 144 may determine an amount of power to provide to propulsor 104 based on signal from propulsor 104, such that controller 144 may increase an amount of power to the propulsor 104 if the deceleration is too high and controller 144 may further decrease the amount of power to the propulsor 104 if the deceleration is too low. In some embodiments, controller 144 may be configured to control a deceleration of a rate of rotation of propulsor 104 by controlling lock 140, specifically braking module. Similar to the above, if a pilot inputs in controls a command to stop powering propulsor 104, controller 144 may gradually engage lock 140. For example, controller 144 may gradually extend the plunger from the coil, causing second braking pad to press against first braking pad. Controller 144 may control the amount of pressure between first braking pad and second braking pad based on signal from propulsor sensor 132 to control a rate of deceleration of propulsor 104. Controller 144 may increase an amount of pressure between first braking pad and second braking pad if the deceleration is too high and controller 144 may further decrease pressure between first braking pad and second braking pad if the deceleration is too low. A rate of deceleration of propulsor 104 may be based on one or more predetermined rates, such as on optimate rate of deceleration, an optimal range of rates of deceleration, and/or a threshold deceleration. As used in this disclosure, a "threshold deceleration" is a predetermined rate of deceleration of a propulsor 104 in which a deceleration of a rotation of the propulsor 104 should not exceed. Controller 144 may be configured to engage and disengage lock 140 based on signal from propulsor sensor 132. For example, controller 144 may be configured to disengage lock 140 when rotor 120 is rotating. Controller 144 may be configured to stop an application of switching at stator 116 when lock 140 is engaged and propulsor 104 is locked.

Figure 2:
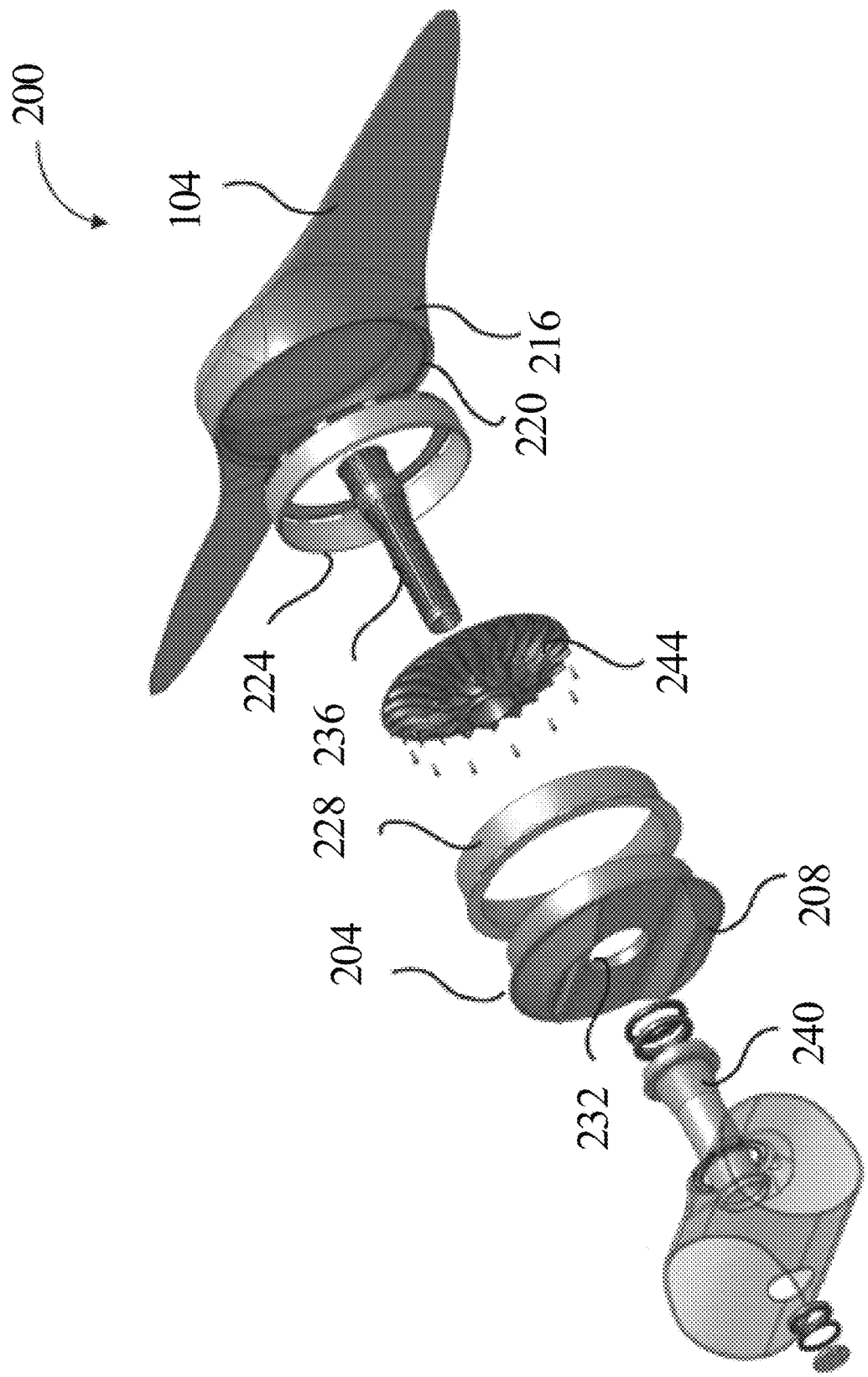
FIG. 2 is an exploded view of an exemplary motor according to an embodiment of the disclosure.

Referring now to FIG. 2, an exemplary embodiment of a motor 200 is illustrated. Motor 200 may include at least a stator 204. Stator 204, as used herein, is a stationary component of a motor and/or motor assembly. In an embodiment, stator 204 may include at least first magnetic element 208. As used herein, first magnetic element 208 is an element that generates a magnetic field. For example, first magnetic element 208 may include one or more magnets which may be assembled in rows along a structural casing component. Further, first magnetic element 208 may include one or more magnets having magnetic poles oriented in at least a first direction. The magnets may include at least a permanent magnet. Permanent magnets may be composed of, but are not limited to, ceramic, alnico, samarium cobalt, neodymium iron boron materials, any rare earth magnets, and the like. Further, the magnets may include an electromagnet. As used herein, an electromagnet is an electrical component that generates magnetic field via induction; the electromagnet may include a coil of electrically conducting material, through which an electric current flow to generate the magnetic field, also called a field coil of field winding. A coil may be wound around a magnetic core, which may include without limitation an iron core or other magnetic material. The core may include a plurality of steel rings insulated from one another and then laminated together; the steel rings may include slots in which the conducting wire will wrap around to form a coil. First magnetic element 208 may act to produce or generate a magnetic field to cause other magnetic elements to rotate, as described in further detail below. Stator 204 may include a frame to house components including first magnetic element 208, as well as one or more other elements or components as described in further detail below. In an embodiment, a magnetic field may be generated by first magnetic element 208 and can include a variable magnetic field. In embodiments, a variable magnetic field may be achieved by use of an inverter, a controller, or the like. In an embodiment, stator 204 may have an inner and outer cylindrical surface; a plurality of magnetic poles may extend outward from the outer cylindrical surface of the stator. In an embodiment, stator 204 may include an annular stator, wherein the stator is ring-shaped. In an embodiment, stator 204 is incorporated into a DC motor where stator 204 is fixed and functions to supply the magnetic fields where a corresponding rotor, as described in further detail below, rotates. In an embodiment, stator 204 may be incorporated an AC motor where stator 204 is fixed and functions to supply the magnetic fields by radio frequency electric currents through an electromagnet to a corresponding rotor, as described in further detail below, rotates.

Still referring to FIG. 2, motor 200 may include propulsor 104. In embodiments, propulsor 104 may include an integrated rotor. As used herein, a rotor is a portion of an electric motor that rotates with respect to a stator of the electric motor, such as stator 204. A propulsor, as used herein, is a component or device used to propel a craft by exerting force on a fluid medium, which may include a gaseous medium such as air or a liquid medium such as water. Propulsor 104 may be any device or component that consumes electrical power on demand to propel an aircraft or other vehicle while on ground and/or in flight. Propulsor 104 may include one or more propulsive devices. In an embodiment, propulsor 104 may include a thrust element which may be integrated into the propulsor. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. As another non-limiting example, at least a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like. In an embodiment, propulsor 104 may include at least a blade. Persons skilled in the art, upon reviewing the entirety of this disclosure, will be aware of various devices that may be used as propulsor 104. In an embodiment, when a propulsor twists and pulls air behind it, it will, at the same time, push the aircraft forward with an equal amount of force. The more air pulled behind the aircraft, the more the aircraft is pushed forward. In an embodiment, thrust element may include a helicopter rotor incorporated into propulsor 104. A helicopter rotor, as used herein, may include one or more blade or wing elements driven in a rotary motion to drive fluid medium in a direction axial to the rotation of the blade or wing element. Its rotation is due to the interaction between the windings and magnetic fields which produces a torque around the rotor's axis. A helicopter rotor may include a plurality of blade or wing elements.

Continuing to refer to FIG. 2, in an embodiment, propulsor 104 may include hub 216 rotatably mounted to stator 204. Rotatably mounted, as described herein, is functionally secured in a manner to allow rotation. Hub 216 is a structure which allows for the mechanically coupling of components of the integrated rotor assembly. In an embodiment, hub 216 can be mechanically coupled to propellers or blades. In an embodiment, hub 216 may be cylindrical in shape such that it may be mechanically joined to other components of the rotor assembly. Hub 216 may be constructed of any suitable material or combination of materials, including without limitation metal such as aluminum, titanium, steel, or the like, polymer materials or composites, fiberglass, carbon fiber, wood, or any other suitable material. Hub 216 may move in a rotational manner driven by interaction between stator and components in the rotor assembly. Persons skilled in the art, upon reviewing the entirety of this disclosure, will be aware of various structures that may be used as or included as hub 216, as used and described herein.

Still referring to FIG. 2, in an embodiment, propulsor 104 and/or rotor shaft 236 may include second magnetic element 220, which may include one or more further magnetic elements. Second magnetic element 220 generates a magnetic field designed to interact with first magnetic element 208. Second magnetic element 220 may be designed with a material such that the magnetic poles of at least a second magnetic element are oriented in an opposite direction from first magnetic element 208. In an embodiment, second magnetic element 220 may be affixed to hub 216, rotor shaft 236, or another rotating or stationary electric motor component disclosed herein. Affixed, as described herein, is the attachment, fastening, connection, and the like, of one component to another component. For example, and without limitation, affixed may include bonding the second magnetic element 220 to hub 216, such as through hardware assembly, spot welding, riveting, brazing, soldering, glue, and the like. Second magnetic element 220 may include any magnetic element suitable for use as first magnetic element 208. For instance, and without limitation, second magnetic element may include a permanent magnet and/or an electromagnet. Second magnetic element 220 may include magnetic poles oriented in a second direction opposite, in whole or in part, of the orientation of the poles of first magnetic element 208. In an embodiment, motor 200 may include a motor assembly incorporating stator 204 with a first magnet element and second magnetic element 220. First magnetic element 208 may include magnetic poles oriented in a first direction, a second magnetic element includes a plurality of magnetic poles oriented in the opposite direction than the plurality of magnetic poles in the first magnetic element 208.

Referring again to FIG. 2, in an embodiment, first magnetic element 208 may be a productive element, defined herein as an element that produces a varying magnetic field. Productive elements may produce magnetic field that may attract and other magnetic elements, possibly including a receptive element. Second magnetic element may be a productive or receptive element. A receptive element may react due to the magnetic field of first magnetic element 208. In an embodiment, first magnetic element 208 may produce a magnetic field according to magnetic poles of first magnetic element 208 oriented in a first direction. Second magnetic element 220 may produce a magnetic field with magnetic poles in the opposite direction of the first magnetic field, which may cause the two magnetic elements to attract one another. Receptive magnetic element may be slightly larger in diameter than the productive element. Interaction of productive and receptive magnetic elements may produce torque and cause the assembly to rotate. Hub 216 and rotor assembly may both be cylindrical in shape where rotor may have a slightly smaller circumference than hub 216 to allow the joining of both structures. Coupling of hub 216 to stator 204 may be accomplished via a surface modification of either hub 216, stator 204 or both to form a locking mechanism. Coupling may be accomplished using additional nuts, bolts, and/or other fastening apparatuses. In an embodiment, an integrated rotor assembly as described above may reduce profile drag in forward flight for an electric aircraft. Profile drag may be caused by a number of external forces that the aircraft is subjected to. In an embodiment, incorporating propulsor 104 into hub 216, may reduce a profile of motor 200 resulting in a reduced profile drag. In an embodiment, the rotor, which may include motor inner magnet carrier 224, motor outer magnet carrier 228, propulsor 104 may be incorporated into hub 216. In an embodiment, inner motor magnet carrier 224 may rotate in response to a magnetic field. The rotation may cause hub 216 to rotate. This unit may be inserted into motor 200 as one unit. This may enable ease of installation, maintenance, and removal.

Still referring to FIG. 2, stator 204 may include through-hole 232. Through-hole 232 may provide an opening for a component to be inserted through to aid in attaching propulsor with integrated rotor and rotor shaft to stator. In an embodiment, through-hole 232 may have a round or cylindrical shape and be located at a rotational axis of stator 204, which in an embodiment may be similar to or the same as axis of rotation 212. Hub 216 may be mounted to stator 204 by means of rotor shaft 236 rotatably inserted though through-hole 232. The rotor shaft 236 may be mechanically coupled to stator 204 such that rotor shaft 236 is free to rotate about its centerline axis, which may be effectively parallel and coincident to stator's centerline axis, and further the rotor shaft and stator may include a void of empty space between them, where at least a portion the outer cylindrical surface of the rotor shaft is not physically contacting at least a portion of the inner cylindrical surface of the stator. This void may be filled, in whole or in part, by air, a vacuum, a partial vacuum or other gas or combination of gaseous elements and/or compounds, to name a few. Through-hole 232 may have a diameter that is slightly larger than a diameter of rotor shaft 236 to allow rotor shaft 236 to fit through through-hole 232 to connect stator 204 to hub 216. Rotor shaft 236 may rotate in response to rotation of propulsor 104.

Still referring to FIG. 2, motor 200 may include a bearing cartridge 240. Bearing cartridge 240 may include a bore. Rotor shaft 236 may be inserted through the bore of bearing cartridge 240. Bearing cartridge 240 may be attached to a structural element of a vehicle. Bearing cartridge 240 functions to support the rotor and to transfer the loads from the motor. Loads may include, without limitation, weight, power, magnetic pull, pitch errors, out of balance situations, and the like. Bearing cartridge 240 may include a bore. Bearing cartridge 240 may include a smooth metal ball or roller that rolls against a smooth inner and outer metal surface. The rollers or balls take the load, allowing the device to spin. a bearing may include, without limitation, a ball bearing, a straight roller bearing, a tapered roller bearing or the like. Bearing cartridge 240 may be subject to a load which may include, without limitation, a radial or a thrust load. Depending on the location of bearing cartridge 240 in the assembly, it may see all of a radial or thrust load or a combination of both. In an embodiment, bearing cartridge 240 may join motor 200 to a structure feature. Bearing cartridge 240 may function to minimize the structural impact from the transfer of bearing loads during flight and/or to increase energy efficiency and power of propulsor. Bearing cartridge 240 may include a shaft and collar arrangement, wherein a shaft affixed into a collar assembly. A bearing element may support the two joined structures by reducing transmission of vibration from such bearings. Roller (rolling-contact) bearings are conventionally used for locating and supporting machine parts such as rotors or rotating shafts. Typically, the rolling elements of a roller bearing are balls or rollers. In general, a roller bearing is a is type of anti-friction bearing; a roller bearing functions to reduce friction allowing free rotation. Also, a roller bearing may act to transfer loads between rotating and stationary members. In an embodiment, bearing cartridge 240 may act to keep propulsor 104 and components intact during flight by allowing motor 200 to rotate freely while resisting loads such as an axial force. In an embodiment, bearing cartridge 240 may include a roller bearing incorporated into the bore. a roller bearing is in contact with rotor shaft 236. Stator 204 may be mechanically coupled to inverter housing. Mechanically coupled may include a mechanical fastening, without limitation, such as nuts, bolts or other fastening device. Mechanically coupled may include welding or casting or the like. Inverter housing may contain a bore which allows insertion by rotor shaft 236 into bearing cartridge 240.

Still referring to FIG. 2, motor 200 may include a motor assembly incorporating a rotating assembly and a stationary assembly. Hub 216, motor inner magnet carrier 224 and rotor shaft 236 may be incorporated into the rotor assembly of motor 200 which make up rotating parts of electric motor, moving between the stator poles and transmitting the motor power. As one integrated part, the rotor assembly may be inserted and removed in one piece. Stator 204 may be incorporated into the stationary part of the motor assembly. Stator and rotor may combine to form an electric motor. In embodiment, an electric motor may, for instance, incorporate coils of wire, which may be similar to or the same as any of the electrically conductive components in the entirety of this disclosure, which are driven by the magnetic force exerted by a first magnetic field on an electric current. The function of the motor may be to convert electrical energy into mechanical energy. In operation, a wire carrying current may create at least a first magnetic field with magnetic poles in a first orientation which interacts with a second magnetic field with magnetic poles oriented in the opposite direction of the first magnetic pole direction causing a force that may move a rotor in a direction. For example, and without limitation, first magnetic element 208 in motor 200 may include an active magnet. For instance, and without limitation, a second magnetic element may include a passive magnet, a magnet that reacts to a magnetic force generated by first magnetic element 208. In an embodiment, a first magnet positioned around the rotor assembly, may generate magnetic fields to affect the position of the rotor relative to the stator 204. A controller may have an ability to adjust electricity originating from a power supply and, thereby, the magnetic forces generated, to ensure stable rotation of the rotor, independent of the forces induced by the machinery process.

Motor 200 may include impeller 244, coupled with the rotor shaft 236. An impeller, as described herein, is a rotor used to increase or decrease the pressure and flow of a fluid, including at least air. Impeller 244 may function to provide cooling to motor 200. Impeller 244 may include varying blade configurations, such as radial blades, non-radial blades, semi-circular blades and airfoil blades. Impeller 244 may further include single and/or double-sided configurations. Impeller 244 is described in further detail below. Additionally, or alternatively, in a non-limiting illustrative example, rotor shaft 236 may be mechanically coupled to cooling vanes. Cooling vanes are used to lower the temperature of a high-velocity mechanical part, like the rotor in an electrical motor. Cooling vanes may employ a plurality of physical principles to cool mechanical parts. Cooling vanes may draw cool air like a fan if mechanically coupled to the rotor at an angle sufficient to create a pressure differential in order to draw cool air from outside the motor housing into the relatively hot inner motor and cool internal mechanical parts by convection. The cooling vanes may alternatively or additionally cool other components disclosed herein with the impeller. Convection cooling in principle, is cooling of a portion of a body by moving a fluid over it, the tendency of heat energy to move from high to low energy areas, like a hot spinning rotor to cool moving air. Additionally, cooling vanes may act as thermodynamic fins. Heat energy may be conducted through the cooling vanes from the hot rotor shaft to the tips of the cooling vanes, thus dissipating heat in a high-speed rotating part. Cooling vanes may be consistent with those disclosed in U.S. patent application Ser. No. 16/910,255 entitled "Integrated Electric Propulsion Assembly" and incorporated herein by reference in its entirety.

Figure 3:
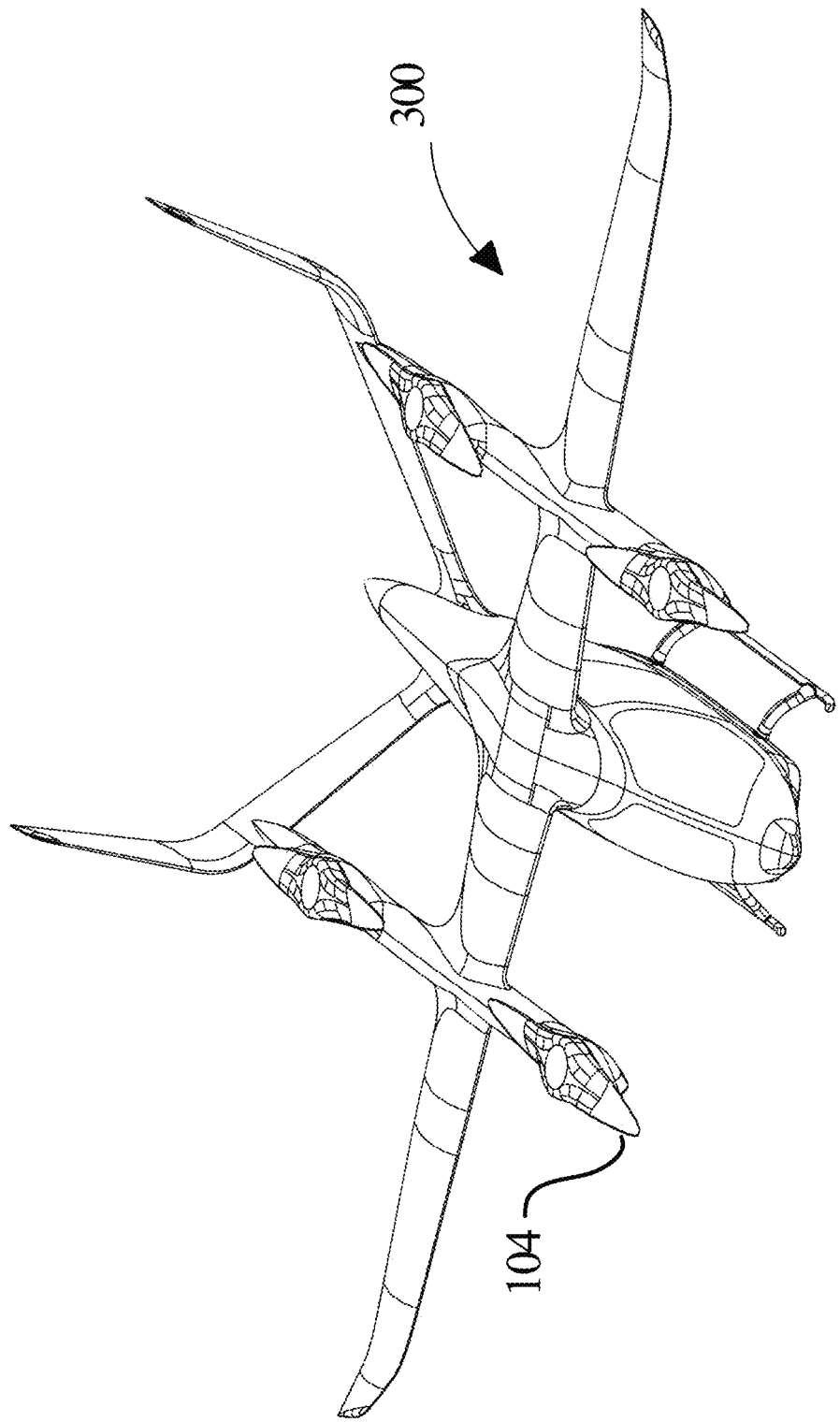
FIG. 3 is a perspective view of a motor incorporated in an electric aircraft according to an embodiment of the disclosure.

Now referring to FIG. 3, an exemplary embodiment of an electric aircraft 300 is illustrated. Electric aircraft 300 may include motor 200 may be mounted on a structural feature of an aircraft. Design of motor 200 may enable it to be installed external to the structural member (such as a boom, nacelle, or fuselage) for easy maintenance access and to minimize accessibility requirements for the structure. This may improve structural efficiency by requiring fewer large holes in the mounting area. This design may include two main holes in the top and bottom of the mounting area to access bearing cartridge. Further, a structural feature may include a component of electric aircraft 300. For example, and without limitation structural feature may be any portion of a vehicle incorporating motor 200, including any vehicle as described below. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 104. Persons skilled in the art, upon reviewing the entirety of this disclosure, will be aware of various materials, combinations of materials, and/or constructions techniques.

Still referring to FIG. 3, electric aircraft 300 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 3, a number of aerodynamic forces may act upon the electric aircraft 300 during flight. Forces acting on electric aircraft 300 during flight may include, without limitation, thrust, the forward force produced by the rotating element of the electric aircraft 300 and acts parallel to the longitudinal axis. Another force acting upon electric aircraft 300 may be, without limitation, drag, which may be defined as a rearward retarding force which is caused by disruption of airflow by any protruding surface of the electric aircraft 300 such as, without limitation, the wing, rotor, and fuselage. Drag may oppose thrust and acts rearward parallel to the relative wind. A further force acting upon electric aircraft 300 may include, without limitation, weight, which may include a combined load of the electric aircraft 300 itself, crew, baggage, and/or fuel. Weight may pull electric aircraft 300 downward due to the force of gravity. An additional force acting on electric aircraft 300 may include, without limitation, lift, which may act to oppose the downward force of weight and may be produced by the dynamic effect of air acting on the airfoil and/or downward thrust from the propulsor 104 of the electric aircraft. Lift generated by the airfoil may depend on speed of airflow, density of air, total area of an airfoil and/or segment thereof, and/or an angle of attack between air and the airfoil. For example, and without limitation, electric aircraft 300 are designed to be as lightweight as possible. Reducing the weight of the aircraft and designing to reduce the number of components is essential to optimize the weight. To save energy, it may be useful to reduce weight of components of electric aircraft 300, including without limitation propulsors and/or propulsion assemblies. In an embodiment, motor 200 may eliminate need for many external structural features that otherwise might be needed to join one component to another component. Motor 200 may also increase energy efficiency by enabling a lower physical propulsor profile, reducing drag and/or wind resistance. This may also increase durability by lessening the extent to which drag and/or wind resistance add to forces acting on electric aircraft 300 and/or propulsors.

Still referring to FIG. 3, electric aircraft 300 can include motor 200. Motor 200 may include a stator which has a first magnetic generating element generating a first magnetic field. Motor 200 may also include propulsor 104 with an integrated rotor assembly of the motor assembly which may include includes a hub mounted to stator, at least a second magnetic element generating a second magnetic field. First magnetic field and second magnetic field vary with respect to time which generates a magnetic force between both causing the rotor assembly to rotate with respect to the stator.

Figure 4:
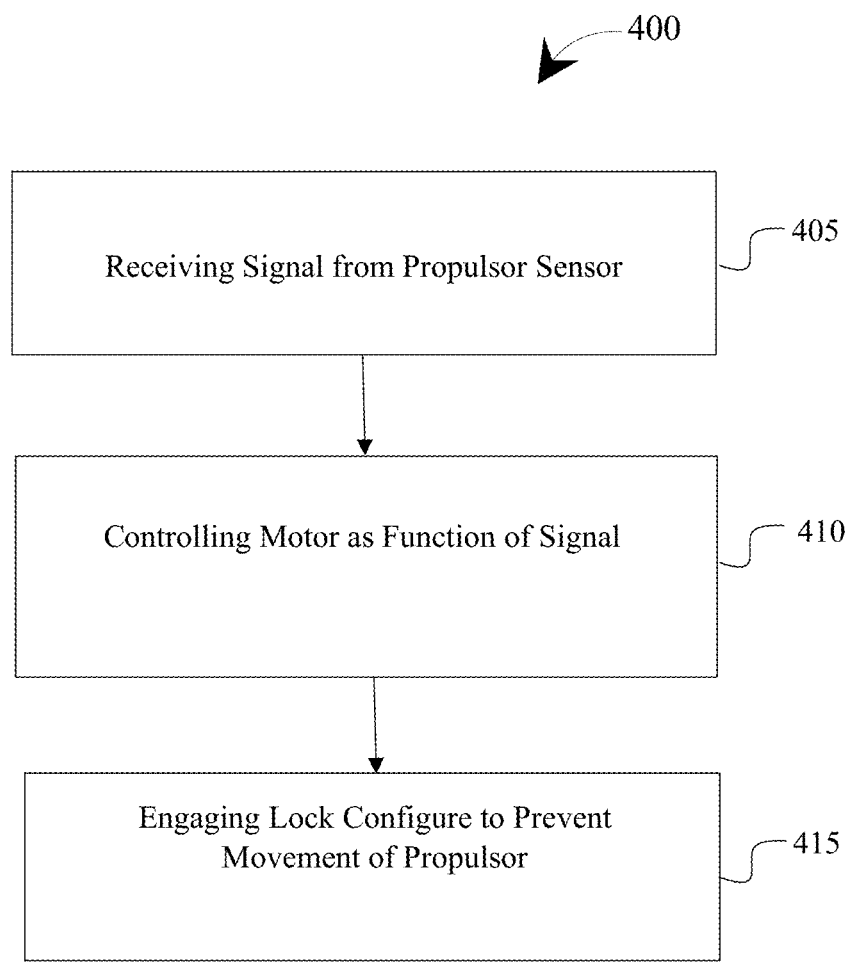
FIG. 4 is a flow chart of an exemplary embodiment of a method of use of the braking system in one or more aspects of the present disclosure.

Referring now to FIG. 4, an exemplary embodiment of a method 400 for locking an electric propulsion system is illustrated. At step 405, controller in electric vehicle receives signal from propulsor sensor configured to determine motion parameter of propulsor; this may be implemented, without limitation, as described above in reference to FIGS. 1-4. Propulsor sensor may comprise a proximity sensor. Signal may be based on a proximity between proximity sensor and proximity sensor target. Signal may be based on a cross sectional thickness of a part of proximity sensor target nearest proximity sensor.

At step 410, controller controls motor as a function of signal from propulsor sensor, motor being operatively connected to propulsor, wherein controlling motor comprises allowing propulsor to slow at a desired rate for parking; this may be implemented, without limitation, as described above in reference to FIGS. 1-4.

At step 415, controller engages a lock configured to prevent a movement of the propulsor; this may be implemented, without limitation, as described above in reference to FIGS. 1-4. Lock may be a magnetic lock controlled by an applied current. Controller may be configured to engage and disengage lock. Controller may be configured to stop applying switching at stator when propulsor is locked. Lock may comprise a solenoid. Engagement of lock may be based on a rotational speed of propulsor. Lock may be configured to decelerate propulsor at desired rate.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
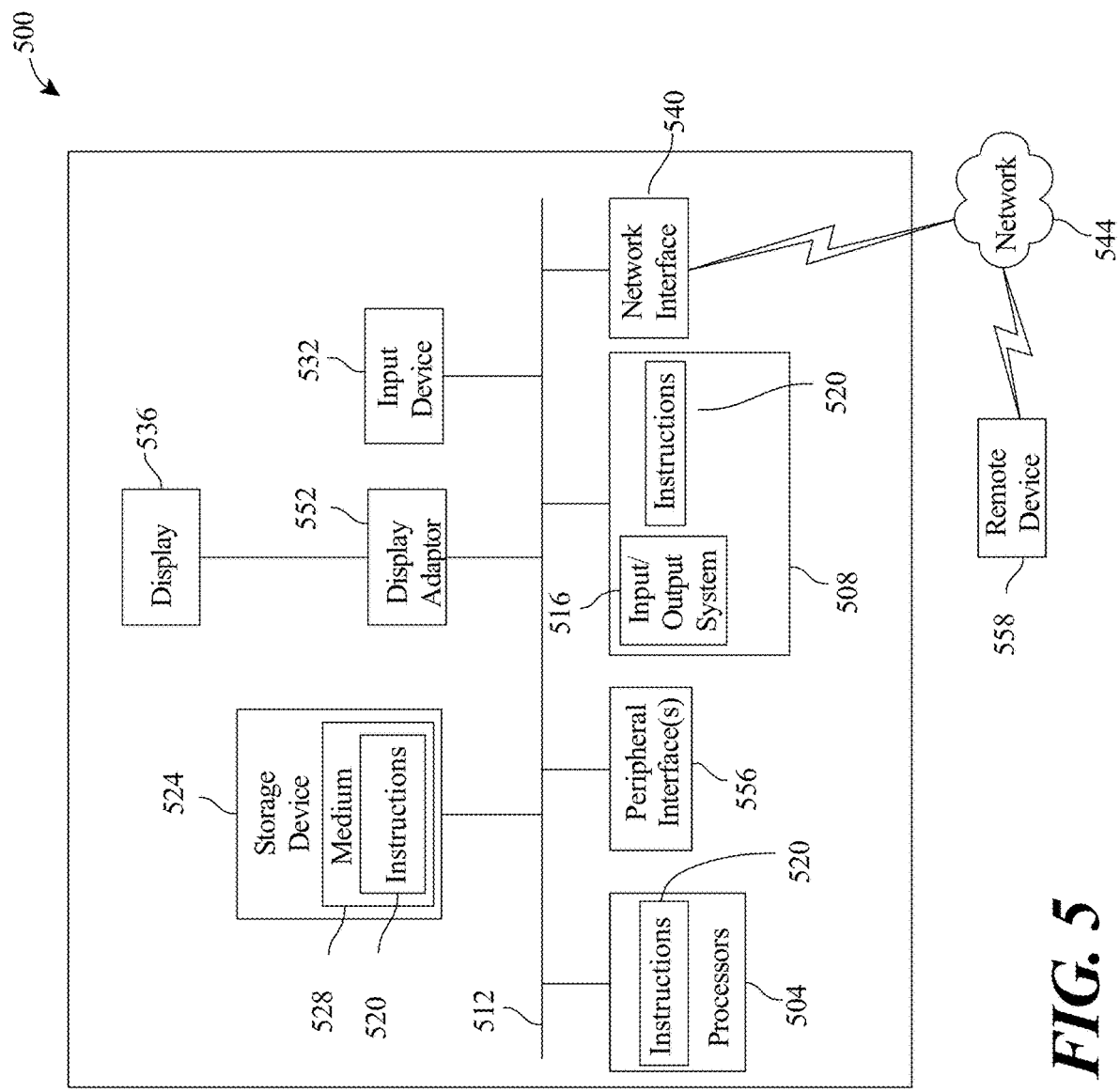
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A locking system for an electric propulsion system, the system comprising:
   a propulsor configured to propel an electric vehicle;
   a motor operatively connected to the propulsor, the motor configured to power the propulsor, the motor comprising:
      a rotor connected to the propulsor and having a rotor shaft; and
      a stator configured to rotate the rotor;
   a propulsor sensor configured to determine a motion parameter of the propulsor, wherein the propulsor sensor comprises a proximity sensor configured to generate a signal based on a proximity between the proximity sensor and a proximity sensor target, wherein:
      the proximity sensor is located on the stator; and
      the proximity sensor target is located on the rotor shaft, wherein the proximity sensor target has an asymmetrical shape that is asymmetrical along an axis parallel to a length of the rotor shaft;
   a lock configured to prevent a movement of the propulsor; and
   a controller in the electric vehicle, the controller configured to:
      receive the signal from the propulsor sensor;
      control the motor as a function of the signal from the propulsor sensor, wherein controlling the motor comprises:
         allowing the propulsor to slow at a desired rate for parking.

2. The system of claim 1, wherein the signal is based on a cross sectional thickness of a part of the proximity sensor target nearest the proximity sensor.

3. The system of claim 1, wherein the lock is a magnetic lock controlled by an applied current.

4. The system of claim 1, wherein the controller is configured to engage and disengage the lock.

5. The system of claim 1, wherein the controller is configured to stop applying switching at the stator when the propulsor is locked.

6. The system of claim 1, wherein the lock comprises a solenoid.

7. The system of claim 1, wherein the engagement of the lock is based on a rotational speed of the propulsor.

8. The system of claim 1, wherein the lock is configured to decelerate the propulsor at the desired rate.

9. The system of claim 1, wherein the proximity sensor target includes a plurality of proximity sensor targets, wherein each proximity sensor target of the plurality of proximity sensor targets is positioned on the rotor radially displaced from other proximity sensor targets of the plurality of proximity sensor targets.

10. The system of claim 1, wherein the controller is further configured to park, using the lock, the propulsor in an optimal position during a flight mode transition of the electric vehicle.

11. A method for locking an electric propulsion system, the method comprising:
   receiving, at a controller in an electric vehicle, a signal from a propulsor sensor configured to determine a motion parameter of a propulsor, wherein the propulsor sensor comprises a proximity sensor and the signal is based on a proximity between the proximity sensor and a proximity sensor target;
   controlling, by the controller, a motor as a function of the signal from the propulsor sensor, the motor operatively connected to the propulsor, wherein controlling the motor comprises allowing the propulsor to slow at a desired rate for parking, wherein:
      the proximity sensor target is located on a rotor shaft of a rotor of the motor, wherein the proximity sensor target has an asymmetrical shape that is asymmetrical along an axis parallel to a length of the rotor shaft, wherein the rotor is connected to the propulsor; and
      the proximity sensor is located on a stator of the motor, wherein the stator is configured to rotate the rotor; and
   engaging, by the controller, a lock configured to prevent a movement of the propulsor.

12. The method of claim 11, wherein the signal is based on a cross sectional thickness of a part of the proximity sensor target nearest the proximity sensor.

13. The method of claim 11, wherein the lock is a magnetic lock controlled by an applied current.

14. The method of claim 11, wherein the controller is configured to engage and disengage the lock.

15. The method of claim 11, wherein the controller is configured to stop applying switching at the stator when the propulsor is locked.

16. The method of claim 11, wherein the lock comprises a solenoid.

17. The method of claim 11, wherein the engagement of the lock is based on a rotational speed of the propulsor.

18. The method of claim 11, wherein the lock is configured to decelerate the propulsor at the desired rate.

19. The method of claim 11, wherein the proximity sensor target includes a plurality of proximity sensor targets, wherein each proximity sensor target of the plurality of proximity sensor targets is positioned on the rotor radially displaced from other proximity sensor targets of the plurality of proximity sensor targets.

20. The method of claim 11, wherein the method further comprises parking, by the controller, the propulsor in an optimal position during a flight mode transition of the electric vehicle.

* * * * *